United States Patent [19]

Nagashima et al.

[11] Patent Number: 5,320,821

[45] Date of Patent: Jun. 14, 1994

[54] METHOD FOR PRODUCING HYDROGEN PEROXIDE

[75] Inventors: Hiromitsu Nagashima, Matsudo; Yukio Ishiuchi, Ushiku; Yasushi Hiramatsu, Niigata; Michiya Kawakami, Tokyo, all of Japan

[73] Assignee: Mitsubishi Gas Chemical Company, Inc., Tokyo, Japan

[21] Appl. No.: 29,413

[22] Filed: Mar. 10, 1993

[30] Foreign Application Priority Data

Mar. 25, 1992 [JP] Japan .................................. 4-067315

[51] Int. Cl.$^5$ ............................................. C01B 15/01
[52] U.S. Cl. ...................................................... 423/584
[58] Field of Search ........................................... 423/584

[56] References Cited

U.S. PATENT DOCUMENTS

| | | | |
|---|---|---|---|
| 3,336,112 | 8/1967 | Hooper | 423/584 |
| 4,009,252 | 2/1977 | Izumi et al. | 423/584 |
| 4,279,883 | 7/1981 | Izumi et al. | 423/584 |
| 4,772,458 | 9/1988 | Gosser et al. | 423/584 |
| 5,132,099 | 7/1992 | Hiramatsu et al. | 423/584 |
| 5,236,692 | 8/1993 | Nagashima et al. | 423/584 |

FOREIGN PATENT DOCUMENTS 0132294  1/1985  European Pat. Off. .

Primary Examiner—Wayne Langel
Attorney, Agent, or Firm—Wenderoth, Lind & Ponack

[57] ABSTRACT

A method for producing a high concentration of hydrogen peroxide by reacting oxygen and hydrogen directly in a neutral reaction medium that contains a promoter comprising a halogen containing compound, which halogen containing compound contains at least one halogen other than fluorine, at a reaction temperature in the range of from 0° to 50° C. and at a reaction pressure in the range of from 3 to 150 kg/cm$^2$·G in the presence of a platinum group metal catalyst supported on a catalyst carrier containing a heteropolyacid that has been made insoluble in water or a platinum group metal catalyst supported on a catalyst carrier comprising activated carbon that is supporting a heteropolyacid.

10 Claims, No Drawings

METHOD FOR PRODUCING HYDROGEN PEROXIDE

INDUSTRIAL FIELD OF THE INVENTION

The present invention relates to an improved method for producing hydrogen peroxide by reacting oxygen and hydrogen directly in the reaction medium in the presence of a platinum group metal catalyst. More specifically, it is a method for producing hydrogen peroxide by reacting oxygen and hydrogen directly in the presence of a platinum group metal catalyst supported on a catalyst carrier containing a heteropoly acid in a reaction medium containing a promoter.

DESCRIPTION OF THE PRIOR ART

At present, the main method used by industry for producing hydrogen peroxide is the autooxidation method using alkyl-anthraquinone. However, the fact that the processes of reduction, oxidation, extraction, purification, and concentration are very complex and the fact that equipment and operations costs are large are the problem points of this method. Additionally, there are loss due to the degradation of alkyl-anthraquinone and problems of the degradation of the hydrogenation catalyst. Several production methods other than the above method have been attempted in order to remedy these problems. One of these is a method for producing hydrogen peroxide directly from oxygen and hydrogen in the reaction medium in the presence of a catalyst. Already, methods for producing hydrogen peroxide from oxygen and hydrogen using platinum group metals as catalysts have been proposed, and the production of moderate concentrations of hydrogen peroxide has been described (Please refer to Japanese Patent Publication No. 47121/1981, Japanese Patent Publication No. 18646/1980, Japanese Patent Publication No. 23401/1989 and Japanese Laid Open Patent Application No. 156005/1988.). All of these use aqueous solutions containing acid and/or inorganic salts as the reaction medium, and, in particular, the selectivity of the reaction to hydrogen peroxide production is increased due to the inhibition of catalytic activity caused by the presence of halogen ions in solution, and a high concentration of hydrogen peroxide is obtained. Japanese Laid Open Patent Application No. 156005/1988 shows that the selective production of a high concentration of hydrogen peroxide due to the presence of a halogen ion such as bromine ion in the reaction medium in a method for using a platinum group catalyst to produce a high concentration of hydrogen peroxide from oxygen and hydrogen under elevated pressure in an acidic solution is possible.

SUMMARY OF THE INVENTION

In prior art methods for the production of hydrogen peroxide by the catalytic reaction of oxygen and hydrogen directly in the reaction medium, it is necessary for there to be a high concentration of acid and halogen ion present in the reaction medium in order to obtain a high concentration of hydrogen peroxide. In this case, together with the fact that the structural materials for equipment that can be used in applications where high concentration acid solutions are used in the presence of halogen ion as the reaction medium are limited, there is also the problem of the dissolution of the catalyst into the acidic solution. This dissolution of the catalyst reduces the catalyst's activity and decreases its life. Moreover, regarding the catalyst metal dissolved into the acidic solution, there are also serious problems in that, in addition to the reduction in quality of the hydrogen peroxide produced, such low concentrations of dissolved metal are extremely difficult to recover by existing recycling methods.

Consequently, in prior art methods, reaction vessels made of expensive structural materials with high corrosion resistance are required, and there is also an economic problem with regard to the necessity of post production treatment for the removal of highly concentrated acid, halogen ions and dissolved catalyst metal.

In order to solve these problems, the inventors of the present invention have offered such methods as those using platinum group metal catalysts supported on complex oxide catalyst carriers containing cerium (U.S. Ser. No. 07/967380), those using platinum group metal catalysts supported on solid acid catalyst carriers or solid super acid catalyst carriers (U.S. Ser. No. 07/853,421), those using a platinum group metal catalysts supported on catalyst carriers that also support inorganic halogen containing compounds that are insoluble in water (U.S. Ser. No. 07/811,035) and those using platinum group metal catalysts supported on resin catalyst carriers containing halogens (U.S. Pat. No. 5132099).

The inventors of the present invention, as a result of continuing investigations into a method for obtaining hydrogen peroxide in high concentration using a neutral reaction medium that does not contain acid, have discovered, in a method for producing hydrogen peroxide directly from oxygen and hydrogen using a catalyst, that it is possible to achieve the following objectives using a platinum group metal catalyst supported on a catalyst carrier containing a heteropoly acid that is insoluble in water. The primary objective of the present invention is to propose a method for producing hydrogen peroxide in which it is possible to obtain a high concentration of hydrogen peroxide by reacting oxygen and hydrogen directly using a neutral aqueous solution that does not contain acid as the reaction medium in the presence of a platinum group metal catalyst. The second objective of the present invention is to offer a method for producing hydrogen peroxide directly from oxygen and hydrogen in which, because it is not necessary in order to purify the hydrogen peroxide produced to remove acid from it, the purification process is less complicated than that of the prior art. The third objective of the present invention is to offer a method for the convenient industrial production of hydrogen peroxide directly from oxygen and hydrogen. By means of the present invention, the problem of the structural materials of the reaction vessels, the problem of removal of acid from the hydrogen peroxide obtained and the problem of the dissolution of the catalyst metal into the reaction medium can be solved, and it is possible to offer an more effective, convenient method for producing hydrogen peroxide directly from oxygen and hydrogen on an industrial scale than is offered by the prior art.

The platinum group metal catalyst containing a heteropoly acid in a form that is insoluble in water of the present invention may contain either a catalyst carrier which is composed entirely of a heteropoly acid that has been made insoluble in water by exchanging a part of the heteropoly acid protons with cations or a catalyst carrier composed of a heteropoly acid supported on a prior art catalyst carrier where the heteropoly acid is made insoluble in water simultaneous with its being supported on the prior art catalyst carrier. The catalyst of the present invention may be prepared by supporting a platinum group metal on one of these catalyst carriers or by supporting a heteropoly acid that is insoluble in water on a catalyst carrier that is already supporting a platinum group metal. Additionally, where activated carbon is used as the component of the catalyst carrier that supports the heteropoly acid, a water soluble heteropoly acid may be used without alteration to make it insoluble in water, and can be supported stably with no dissolution of the heteropoly acid into the reaction medium.

Where oxygen and hydrogen are reacted in a neutral reaction medium using a platinum group metal catalyst supported on a prior art catalyst carrier that does not support a heteropoly acid, which prior art catalyst carriers include such essentially neutral catalyst carriers as oxides such as silica, titania, zirconia and alumina or such essentially neutral catalyst carriers as activated carbon, the selectivity for the hydrogen peroxide production reaction is very low. However, when activated carbon or oxides such as silica, titania, zirconia and alumina are treated by supporting a heteropoly acid on them according to the present invention, it is possible to obtain a far higher selectivity for the hydrogen peroxide production reaction than is observed even when carriers that normally exhibit solid acidity, such as zeolite, are used in reactions to produce hydrogen peroxide by reacting oxygen and hydrogen directly. Consequently, it is possible, using the present invention, to produce a high concentration of hydrogen peroxide in a neutral reaction medium.

The heteropoly acid that is insoluble in water used in the present invention is prepared by making a water soluble heteropoly acid insoluble in water through the exchange of a part of the protons of the heteropoly acid described by the following formula:

$$H_{(8-n)} X^{(n+)} M_{12}O_{40} \cdot mH_2O$$

(In the above formula, "X" is the central hetero atom, "M" is the coordinated metal atom and "n" is the valence of the hetero atom) with such cations as, for example, the ions of the alkali metals. Metallic cations that may be exchanged include the cations of such elements as the alkali metal elements, the alkali earth metal elements and the rare earth metal elements and thallium. In addition, such nonmetallic cations as ammonium ion may be used. In the present invention, such cations as potassium, rubidium, cesium, thallium and ammonium are preferred. Such methods as those where the heteropoly acid is first dissolved in water and then precipitated by addition of an aqueous solution of, for example, an alkali metal salt such as cesium carbonate may be used as the method of cation exchange (making the heteropoly acid insoluble in water).

Either methods whereby the heteropoly acid is made insoluble in water by cation exchange after supporting it on a catalyst carrier or methods whereby a heteropoly acid that has first been made insoluble in water by cation exchange is supported on a catalyst carrier may be used for supporting a heteropoly acid that is insoluble in water on a catalyst carrier. Moreover, it is possible to support a heteropoly acid that is insoluble in water using the same methods on a catalyst carrier that is already supporting a platinum group metal. In addition, when activated carbon is used as the catalyst carrier, the redissolution of the heteropoly acid into water does not occur even when the heteropoly acid supported in this manner on activated carbon has not been made insoluble in water by cation exchange. That is to say, when a catalyst supported on a catalyst carrier prepared using activated carbon as the catalyst carrier component supporting the heteropoly acid is used in the hydrogen peroxide production reaction, if the catalyst carrier is sufficiently washed with water prior to use in the reaction to remove any remaining excess heteropoly acid, it is possible to use such a catalyst in the reaction without any of the heteropoly acid that is still supported on the activated carbon after such washing redissolving into the reaction medium even though it is still in water soluble form (even though it has not been made insoluble in water by cation exchange).

With regard to the form of the catalyst, grains, powder and pellets may be used with no particular limitation. In addition, heteropoly acids that are not soluble in water may be supported on the catalyst carrier in the proportions desired with no particular limitation. The acidity of the catalyst carrier increases to the degree that the amount of heteropoly acid is large. However, when selecting the amount of heteropoly acid to be supported, it is important to keep in mind that the degree of mechanical exfoliation increases with an increase in the amount of heteropoly acid relative to the amount of catalyst carrier. The amount of heteropoly acid to be supported on a catalyst carrier is usually between 0.1% and 50% by weight of the combined carrier and heteropoly acid and preferably 1% to 20% by weight of the combined carrier and heteropoly acid.

When the heteropoly acid is supported on activated carbon, excess heteropoly acid is removed by sufficient washing with water prior to use. The appropriate amount of heteropoly acid to be supported on activated carbon is 20% by weight of the combined heteropoly acid and activated carbon or less.

The catalyst used in the present invention may take the form of a platinum group metal supported on any of the aforementioned carriers that contain a heteropoly acid. As the platinum group metal used in the present invention, concretely, palladium or platinum may be used either singly or in alloys or mixtures. In addition, it is also possible using primarily platinum and/or palladium to include ruthenium, osmium, rhodium, iridium or gold as components of an alloy or mixture (for use as the catalyst). Usually, palladium or platinum are used, and palladium is particularly preferred.

The amount of these platinum group metals supported on the carrier that contains a heteropoly acid is between 0.1% and 10% by weight of the combined metal and catalyst carrier and preferably between 0.5% and 5% by weight of the combined metal and catalyst carrier. For the method of supporting the platinum group metal on the catalyst carrier that contains a heteropoly acid, such prior art methods as impregnation or ion exchange may be used. The amount of the platinum group metal catalyst of the present invention used to produce hydrogen peroxide is between 1 gram and 200 grams per one liter of the reaction medium and preferably between 5 grams and 50 grams per one liter of the reaction medium.

Water may be used as the reaction medium of the present invention, and neutral aqueous solutions containing such various prior art promoters as halogen containing compounds (excluding those halogen containing compounds that contain no halogen other than fluorine) and such amino acids as norleucine may be used as the promoter of the present invention. As the promoter, halogen containing compounds are preferred and, as the halogen containing compound, concretely, such chlorine containing compounds as sodium chloride, potassium chloride, ammonium chloride; such bromine containing compounds as sodium bromate, sodium bromide, potassium bromide, ammonium bromide and hydrobromic acid and such iodine containing compounds as sodium iodide, potassium iodide and ammonium iodide may be used. However, sodium bromate, sodium bromide, ammonium bromide and ammonium chloride are preferred.

In addition, such prior art hydrogen peroxide stabilizers that inhibit decomposition of hydrogen peroxide as ethylenediamine- tetra(methylenephosphonic acid), aminotri-(methylenephosphonic acid), 1-hydroxyethylidene-1,1-diphosphonic acid, the sodium salts of the preceding compounds and sodium pyrophosphate may be added to the reaction medium.

The amount of the promoter used depends upon the amount of the catalyst used, and usually is 0.001 millimole or more of promoter per one liter of reaction medium and preferably 0.1 millimole or more of promoter per one liter of reaction medium. There is no particular maximum amount of promoter that may be used. However, even if a large excess of promoter is added no corresponding increase in effectiveness is obtained. The amount of promoter used is determined by optimization on a case by case basis according to the amount of catalyst and the kind of promoter used.

The production of hydrogen peroxide according to the present invention is carried out by bringing oxygen and hydrogen together in the reaction medium either in the presence or the absence of an inert gas such as nitrogen which will not impede the progress of the reaction under a reaction pressure of between 3 kg/cm$^2$·G and 150 kg/cm$^2$·G, a reaction temperature of 0° C. to 50° C. and a reaction time of 30 minutes to 6 hours.

The present invention is explained below in more detail by Examples and Comparative Experiments. The gas composition values used in the Examples are gas chromatography values. The measurement of hydrogen peroxide concentration in the reaction mixture was performed by titration using sulfuric acid - potassium permanganate. Additionally, measurements of the concentration of palladium in the reaction mixture after the reaction were made by inductively coupled plasma emission spectroscopy using an SPS 1200 VR type spectrophotometer made by Seiko Instruments, Inc.

EXAMPLE 1

The preparation of the catalyst carrier was accomplished by the method described below. After suspending and sufficiently stirring 8 g of silicon dioxide (manufactured by Mizusawa Industrial Chemicals, Ltd., average grain diameter: 25 μm) in a solution of 2.08 g of commercially available phosphotungstic acid (manufactured by Koso Chemical Company, Ltd.) dissolved in 100 ml of water, a solution of 0.13 g of commercially available cesium carbonate (manufactured by Kanto Chemical Company, Inc.) completely dissolved in 20 ml of pure water was added, and cesium substituted phosphotungstic acid was precipitated onto the silicon dioxide. After the substance thus obtained was placed on a hot plate to remove the water, dried at 110° C. for 24 hours in a dryer, it was calcined for 3 hours at 150° C. under a flow of air to obtain 10 g of catalyst carrier consisting essentially of cesium substituted phosphotungstic acid supported on silicon dioxide. In this way, the molar ratio of phosphotungstic acid and cesium carbonate was made 1 mole of phosphotungstic acid to 1 mole of cesium carbonate, and cesium substituted phosphotungstic acid was supported to the extent that the amount of cesium substituted phosphotungstic acid was equal to 20% by weight of the amount of silicon dioxide. As the active component of the catalyst, palladium, in an amount sufficient to equal 1% by weight of the catalyst carrier, was supported onto 2.475 g of the catalyst carrier obtained above by impregnation using 50 ml of a palladium nitrate solution having a palladium concentration of 0.5 g of palladium per liter. After drying the palladium nitrate impregnated catalyst carrier for 24 hours at 110° C. in a dryer, washing it thoroughly with pure water, and calcining it at 150° C. for 2 hours under a stream of air, it was reduced by being placed for one hour under a stream of hydrogen gas at 150° C., and a catalyst was obtained.

The reaction to produce hydrogen peroxide from oxygen and hydrogen was carrier out as follows. Into a glass vessel with 65 ml capacity was added 10 g of an aqueous solution containing 0.5 millimole per liter of sodium bromate. To this solution was added 50 mg of the supported palladium catalyst prepared above, and the glass vessel was placed in a 100 ml capacity autoclave. After exchanging the air of the autoclave with a gaseous mixture consisting by volume of 3.5% hydrogen gas, 35% oxygen gas and 61.5% nitrogen gas, this same gaseous mixture was added to the autoclave until the pressure reached 50 kg/cm$^2$·G. The reaction was stirred for one hour at 10° C. and 2000 rpm. Upon the cessation of stirring after one hour, the concentration of hydrogen peroxide produced in the reaction mixture was 1.19% by weight of the reaction mixture, and the hydrogen selectivity was 87%. The hydrogen selectivity was calculated as follows.

Hydrogen selectivity (%) = ((the amount of hydrogen peroxide produced by the reaction in moles) ÷ (the amount of hydrogen peroxide theoretically produced from the amount of hydrogen consumed in moles.)) × 100.

Additionally, the result of measuring the concentration of palladium in the reaction mixture after the reaction and separation of the catalyst by filtration was 0.1 ppm.

EXAMPLE 2

Except for the use of an amount of cesium substituted phosphotungstic acid supported on silicon dioxide equal to 5% of the weight of the silicon dioxide, the catalyst preparation and hydrogen peroxide production reaction were performed under the same conditions as in Example 1. Upon the cessation of stirring after one hour, the concentration of hydrogen peroxide produced in the reaction mixture was 1.14% by weight of the reaction mixture, and the hydrogen selectivity was 74%. Additionally, the result of measuring the concentration of palladium in the reaction mixture after the reaction and separation of the catalyst by filtration was 0.1 ppm.

COMPARATIVE EXPERIMENT 1

Except for the use of commercially available silicon dioxide (manufactured by Mizusawa Industrial Chemicals, Ltd.) as the catalyst carrier and the use of 10 g of an aqueous solution of 0.1 moles per liter of sulfuric acid and 0.5 millimole per liter of sodium bromate in place of 10 g of an aqueous solution containing 0.5 millimole per liter of sodium bromate as the reaction medium, the catalyst preparation and hydrogen peroxide production reaction were performed under the same conditions as in Example 1. Upon the cessation of stirring after one hour, the concentration of hydrogen peroxide produced in the reaction mixture was 0.97% by weight of the reaction mixture, and the hydrogen selectivity was 90%. Additionally, the result of measuring the concentration of palladium in the reaction mixture after the reaction and separation of the catalyst by filtration was 1.5 ppm. It is possible to understand from a comparison of the results of this Comparative Experiment with the results of Examples 1 and 2 that the use of sulfuric acid as in the prior art causes the amount of palladium dissolved into the reaction mixture to be large.

EXAMPLE 3

Except for the use of palladium catalyst previously supported on silicon dioxide to the extent that the amount of palladium supported was equal to 1% by weight of the amount of silicon dioxide in place of commercially available silicon dioxide, so that the amount of cesium substituted phosphotungstic acid supported on this silicon dioxide supported palladium was equal to 20% by weight of the combined amount of silicon dioxide, palladium and cesium substituted phosphotungstic acid using the methods of Example 1 and except for the fact that no subsequent impregnation of the catalyst carrier by palladium was performed, the catalyst preparation and hydrogen peroxide production reaction were performed under the same conditions as in Example 1. Upon the cessation of stirring after one hour, the concentration of hydrogen peroxide produced in the reaction mixture was 1.10% by weight of the reaction mixture, and the hydrogen selectivity was 98%. Additionally, the result of measuring the concentration of palladium in the reaction mixture after the reaction and separation of the catalyst by filtration was 0.0 ppm.

EXAMPLE 4

Except for the use of an amount of the cesium substituted phosphotungstic acid supported on the silicon dioxide supported 1% by weight palladium catalyst of Example 3 where the amount of cesium substituted phosphotungstic acid was equal to 5% by weight of the combined amount of silicon dioxide, palladium and cesium substituted phosphotungstic acid, the catalyst preparation and hydrogen peroxide production reaction were performed under the same conditions as in Example 3. Upon the cessation of stirring after one hour, the concentration of hydrogen peroxide produced in the reaction mixture was 0.76% by weight of the reaction mixture, and the hydrogen selectivity was 76%. Additionally, the result of measuring the concentration of palladium in the reaction mixture after the reaction and separation of the catalyst by filtration was 0.0 ppm.

EXAMPLE 5

Except for the use, in the method for preparing the catalyst, of commercially available titanium oxide (manufactured by the Kanto Chemical Company, Inc.) in place of commercially available silicon dioxide in the catalyst carrier, the catalyst preparation and hydrogen peroxide production reaction were performed under the same conditions as in Example 1. Upon the cessation of stirring after one hour, the concentration of hydrogen peroxide produced in the reaction mixture was 1.38% by weight of the reaction mixture, and the hydrogen selectivity was 78%. Additionally, the result of measuring the concentration of palladium in the reaction mixture after the reaction and separation of the catalyst by filtration was 0.1 ppm.

EXAMPLE 6

Except for the use, in the method for preparing the catalyst, of commercially available zirconium oxide (manufactured by the Kanto Chemical Company, Inc.) in place of commercially available silicon dioxide in the catalyst carrier, the catalyst preparation and hydrogen peroxide production reaction were performed under the same conditions as in Example 1. Upon the cessation of stirring after one hour, the concentration of hydrogen peroxide produced in the reaction mixture was 1.33% by weight of the reaction mixture, and the hydrogen selectivity was 87%. Additionally, the result of measuring the concentration of palladium in the reaction mixture after the reaction and separation of the catalyst by filtration was 0.1 ppm.

EXAMPLE 7

Except for the use, in the method for preparing the catalyst, of commercially available α-alumina (manufactured by the Kanto Chemical Company, Inc.) in place of commercially available silicon dioxide in the catalyst carrier, the catalyst preparation and hydrogen peroxide production reaction were performed under the same conditions as in Example 1. Upon the cessation of stirring after one hour, the concentration of hydrogen peroxide produced in the reaction mixture was 0.68% by weight of the reaction mixture, and the hydrogen selectivity was 67%. Additionally, the result of measuring the concentration of palladium in the reaction mixture after the reaction and separation of the catalyst by filtration was 0.1 ppm.

EXAMPLE 8

Except for preparation of the catalyst carrier by supporting cesium substituted phosphotungstic acid on a palladium catalyst previously supported on activated carbon (manufactured by N. E. Chemcat Corporation: water content 52.24%) in which the amount of palladium supported was equal to 5% by weight of the amount of activated carbon in place of commercially available silicon dioxide, so that the amount of cesium substituted phosphotungstic acid supported was equal to 10% by weight of the combined amount of activated carbon, palladium and cesium substituted phosphotungstic acid using the methods of Example 1 and except for the fact that no subsequent impregnation of the catalyst carrier by palladium was performed, the catalyst preparation and hydrogen peroxide production reaction were performed under the same conditions as in Example 1. Upon the cessation of stirring after one hour, the concentration of hydrogen peroxide produced in the reaction mixture was 0.97% by weight of the reaction mixture, and the hydrogen selectivity was 61%. Additionally, the result of measuring the concentration of palladium in the reaction mixture after the reaction and separation of the catalyst by filtration was 0.1 ppm.

EXAMPLE 9

The activated carbon supported palladium catalyst of Example 8 (manufactured by N. E. Chemcat Corporation: water content 52.24%) was immersed in methanol and a methanol solution of phosphotungstic acid in which the amount of phosphotungstic acid dissolved was equal to 10% by weight of the combined amount of activated carbon and palladium and, after removing the solvent using a rotary evaporator, a palladium catalyst supported on an activated carbon catalyst carrier containing a heteropoly acid was obtained. After drying this catalyst for 24 hours at 110° C. in a dryer, it was calcined at 150° C. for 2 hours under a stream of air and reduced at 150° C. for one hour under a stream of hydrogen gas to obtain the catalyst in its final form. Using this catalyst, the hydrogen peroxide production reaction was performed under the same conditions as in Example 1. Upon the cessation of stirring after one hour, the concentration of hydrogen peroxide produced in the reaction mixture was 0.75% by weight of the reaction mixture, and the hydrogen selectivity was 65%. Additionally, the result of measuring the concentration of palladium in the reaction mixture after the reaction and separation of the catalyst by filtration was 0.1 ppm.

EXAMPLE 10

A solution of 19.81 g of commercially available phosphotungstic acid (manufactured by Koso Chemical Company, Ltd.) dissolved in 100 ml of water was added to a solution of 2.07 g of commercially available cesium carbonate (manufactured by Kanto Chemical Company, Inc.) completely dissolved in 20 ml of pure water, and cesium substituted phosphotungstic acid was precipitated, placed on a hot plate to remove the water, dried and heated at 110° C. for 24 hours in a dryer. After calcining the cesium substituted phosphotungstic acid thus obtained for 3 hours at 500° C. under a flow of air, a catalyst carrier was obtained. The active component of the catalyst, palladium, was supported in an amount sufficient to equal 1% by weight of the catalyst carrier, by impregnation using 50 ml of a palladium nitrate solution having a palladium concentration of 0.5 g of palladium per liter onto 2.475 g of the catalyst carrier obtained above. After drying the palladium nitrate impregnated catalyst carrier for 24 hours at 110° C. in a dryer, washing it thoroughly with pure water, and calcining it at 400° C. for 2 hours under a stream of air, it was reduced for one hour under a stream of hydrogen gas at 200° C., and a catalyst was obtained.

Using this catalyst, the hydrogen peroxide production reaction was performed under the same conditions as in Example 1. Upon the cessation of stirring after one hour, the concentration of hydrogen peroxide produced in the reaction mixture was 0.87% by weight of the reaction mixture, and the hydrogen selectivity was 60%.

EXAMPLE 11

Except for the use, in the method for preparing the catalyst, of 0.09 g of commercially available potassium carbonate (manufactured by the Kanto Chemical Company, Inc.) in place of commercially available cesium carbonate to obtain a catalyst carrier containing 20% by weight of potassium substituted phosphotungstic acid, the catalyst preparation and hydrogen peroxide production reaction were performed under the same conditions as in Example 1. Upon the cessation of stirring after one hour, the concentration of hydrogen peroxide produced in the reaction mixture was 1.14% by weight of the reaction mixture, and the hydrogen selectivity was 89%.

EXAMPLE 12

Except for the use, in the method for preparing the catalyst, of 0.32 g of commercially available thallium nitrate (manufactured by the Kanto Chemical Company, Inc.) in place of commercially available cesium carbonate to obtain a catalyst carrier containing 20% by weight of thallium substituted phosphotungstic acid, the catalyst preparation and hydrogen peroxide production reaction were performed under the same conditions as in Example 1. Upon the cessation of stirring after one hour, the concentration of hydrogen peroxide produced in the reaction mixture was 1.26% by weight of the reaction mixture, and the hydrogen selectivity was 69%.

EXAMPLE 13

Except for the use, in the method for preparing the catalyst, of 0.19 g of commercially available rubidium carbonate (manufactured by the Kanto Chemical Company, Inc.) in place of commercially available cesium carbonate to obtain a catalyst carrier containing 20% by weight of rubidium substituted phosphotungstic acid, the catalyst preparation and hydrogen peroxide production reaction were performed under the same conditions as in Example 1. Upon the cessation of stirring after one hour, the concentration of hydrogen peroxide produced in the reaction mixture was 0.99% by weight of the reaction mixture, and the hydrogen selectivity was 72%.

EXAMPLE 14

Except for the use, in the method for preparing the catalyst, of 0.12 g of a commercially available 30% aqueous solution of ammonia (manufactured by the Kanto Chemical Company, Inc.) in place of commercially available cesium carbonate to obtain a catalyst carrier containing 20% by weight of ammonia substituted phosphotungstic acid, the catalyst preparation and hydrogen peroxide production reaction were performed under the same conditions as in Example 1. Upon the cessation of stirring after one hour, the concentration of hydrogen peroxide produced in the reaction mixture was 0.75% by weight of the reaction mixture, and the hydrogen selectivity was 60%.

EXAMPLE 15

Except for the use, in the method for preparing the catalyst, of 1.50 g of commercially available phosphomolybdic acid (manufactured by the Koso Chemical Company, Ltd.) in place of commercially available phosphotungstic acid to obtain a catalyst carrier containing 20% by weight of cesium substituted phosphomolybdic acid, the catalyst preparation and hydrogen peroxide production reaction were performed under the same conditions as in Example 1. Upon the cessation of stirring after one hour, the concentration of hydrogen peroxide produced in the reaction mixture was 1.02% by weight of the reaction mixture, and the hydrogen selectivity was 94%.

EXAMPLE 16

Except that in the method for preparing the catalyst, 1.21 g of commercially available silicotungstic acid (manufactured by the Koso Chemical Company, Ltd.) were used in place of commercially available phosphotungstic acid and that a catalyst carrier containing 20% by weight of cesium substituted silicotungstic acid was obtained, the catalyst preparation and hydrogen peroxide production reaction were performed under the same conditions as in Example 1. Upon the cessation of stirring after one hour, the concentration of hydrogen peroxide produced in the reaction mixture was 0.75% by weight of the reaction mixture, and the hydrogen selectivity was 65%.

EXAMPLE 17

Except for the use of 10 g of an 0.2 mole per liter aqueous solution of ammonium chloride as the reaction medium in place of 10 g of an aqueous solution of 0.5 millimole per liter of sodium bromate, the catalyst preparation and hydrogen peroxide production reaction were performed under the same conditions as in Example 1. Upon the cessation of stirring after one hour, the concentration of hydrogen peroxide produced in the reaction mixture was 0.77% by weight of the reaction mixture, and the hydrogen selectivity was 58%.

EXAMPLE 18

Except for the use of 10 g of an 0.1 millimole per liter aqueous solution of sodium bromide as the reaction medium in place of 10 g of an aqueous solution of 0.5 millimole per liter of sodium bromate, the catalyst preparation and hydrogen peroxide production reaction were performed under the same conditions as in Example 1. Upon the cessation of stirring after one hour, the concentration of hydrogen peroxide produced in the reaction mixture was 0.89% by weight of the reaction mixture, and the hydrogen selectivity was 77%.

EXAMPLE 19

Except for the use of a platinum catalyst supported on a catalyst carrier and prepared by impregnation of the cesium substituted phosphotungstic acid of Example 1 by hexachloroplatinic acid, in which platinum, the active component of the catalyst, was supported in an amount equal to 0.5% of the weight of the catalyst carrier, and except for the use of 10 g of an 0.5 millimole per liter aqueous solution of potassium iodide as the reaction medium in place of 10 g of an aqueous solution of 0.5 millimole per liter of sodium bromate, the catalyst preparation and hydrogen peroxide production reaction were performed under the same conditions as in Example 1. Upon the cessation of stirring after one hour, the concentration of hydrogen peroxide produced in the reaction mixture was 0.77% by weight of the reaction mixture, and the hydrogen selectivity was 58%.

EXAMPLE 20

Except for the use of 10 g of an aqueous solution of 70 ppm of ethylenediaminetetra(methylenephosphonic acid) and 0.5 millimole per liter of sodium bromate as the reaction medium in place of 10 g of an aqueous solution of 0.5 millimole per liter of sodium bromate, the catalyst preparation and hydrogen peroxide production reaction were performed under the same conditions as in Example 1. Upon the cessation of stirring after one hour, the concentration of hydrogen peroxide produced in the reaction mixture was 1.22% by weight of the reaction mixture, and the hydrogen selectivity was 90%.

EXAMPLE 21

Except for the use of 10 g of an aqueous solution of 60 ppm of sodium pyrophosphate and 0.5 millimole per liter of sodium bromate as the reaction medium in place of 10 g of an aqueous solution of 0.5 millimole per liter of sodium bromate, the catalyst preparation and hydrogen peroxide production reaction were performed under the same conditions as in Example 1. Upon the cessation of stirring after one hour, the concentration of hydrogen peroxide produced in the reaction mixture was 1.15% by weight of the reaction mixture, and the hydrogen selectivity was 86%.

COMPARATIVE EXPERIMENT 2

Except for the use of pure silicon dioxide (manufactured by Mizusawa Industrial Chemicals, Ltd.) that did not contain a heteropoly acid as the catalyst carrier, the palladium catalyst preparation and hydrogen peroxide production reaction were performed under the same conditions as in Example 1. Upon the cessation of stirring after one hour, the concentration of hydrogen peroxide produced in the reaction mixture was 0.33% by weight of the reaction mixture, and the hydrogen selectivity was 38%.

COMPARATIVE EXPERIMENT 3

Except for the use of pure titanium oxide (manufactured by Kanto Chemical Company, Inc.) that did not contain a heteropoly acid as the catalyst carrier, the palladium catalyst preparation and hydrogen peroxide production reaction were performed under the same conditions as in Example 1. Upon the cessation of stirring after one hour, the concentration of hydrogen peroxide produced in the reaction mixture was 0.30% by weight of the reaction mixture, and the hydrogen selectivity was 35%.

COMPARATIVE EXPERIMENT 4

Except for the use of pure zirconium oxide (manufactured by Kanto Chemical Company, Inc.) that did not contain a heteropoly acid as the catalyst carrier, the palladium catalyst preparation and hydrogen peroxide production reaction were performed under the same conditions as in Example 1. Upon the cessation of stirring after one hour, the concentration of hydrogen peroxide produced in the reaction mixture was 0.35% by weight of the reaction mixture, and the hydrogen selectivity was 36%.

COMPARATIVE EXPERIMENT 5

Except for the use of pure α-alumina (manufactured by Kanto Chemical Company, Inc.) that did not contain a heteropoly acid as the catalyst carrier, the palladium catalyst preparation and hydrogen peroxide production reaction were performed under the same conditions as in Example 1. Upon the cessation of stirring after one hour, the concentration of hydrogen peroxide produced in the reaction mixture was 0.10% by weight of the reaction mixture, and the hydrogen selectivity was 13%.

COMPARATIVE EXPERIMENT 6

Except for the use of 21 mg of activated carbon supported 5% by weight palladium catalyst (manufactured by N. E. Chemcat Corporation: water content 52.24%) that did not contain a heteropoly acid as the catalyst, the palladium catalyst preparation and hydrogen peroxide production reaction were performed under the same conditions as in Example 1. Upon the cessation of stirring after one hour, the concentration of hydrogen peroxide produced in the reaction mixture was 0.02% by weight of the reaction mixture, and the hydrogen selectivity was 1%.

COMPARATIVE EXPERIMENT 7

Except for the use of the proton form of MFI type zeolite as the catalyst carrier, the palladium catalyst preparation and hydrogen peroxide production reaction were performed under the same conditions as in Example 1. Upon the cessation of stirring after one hour, the concentration of hydrogen peroxide produced in the reaction mixture was 0.49% by weight of the reaction mixture, and the hydrogen selectivity was 46%.

4. EFFECTS OF THE PRESENT INVENTION

Compared with the Comparative Experiments, the concentration of hydrogen peroxide obtained and the hydrogen selectivity observed in the Examples were very high. It is possible to selectively produce high concentrations of hydrogen peroxide using the platinum group metal catalyst of the present invention even where the reaction medium contains no acid. Thus, since there is no necessity for the reaction medium of the present invention to contain a high concentration of acid, it is possible to reduce the problem of dissolution into the reaction medium of the catalyst and the problem of the corrosion of the reaction vessel structural materials.

What we claim is:

1. A method for producing hydrogen peroxide by reacting oxygen and hydrogen directly in a reaction medium containing a promoter and using a platinum group metal catalyst supported on a catalyst carrier comprising a heteropoly acid that has been made insoluble in water by having part of the heteropoly acid protons exchanged with cations selected from the group consisting of the ions of the alkali metals, the alkali earth metals, the rare earth metals, thallium and ammonium, or a heteropoly acid that has been made insoluble in water by being adsorbed on activated carbon without having part of the heteropoly acid protons exchanged with cations.

2. A method for producing hydrogen peroxide according to claim 1 wherein the ion of the alkali metal element of claim 1 is an ion selected from the group consisting of the ions of potassium, rubidium and cesium.

3. A method for producing hydrogen peroxide according to claim 1 wherein the heteropoly acid is a heteropoly acid selected from the group consisting of silicotungstic acid, phosphomolybdic acid and phosphotungstic acid.

4. A method for producing hydrogen peroxide according to claim 1 wherein the platinum group metal catalyst of claim 1 is palladium or platinum.

5. A method for producing hydrogen peroxide according to claim 1 wherein the promoter of claim 1 is a halogen containing compound, which compound excludes compounds containing only fluorine.

6. A method for producing hydrogen peroxide according to claim 5 wherein the halogen containing compound of claim 8 is a compound selected from the group consisting of sodium bromate, sodium bromide, potassium bromide, ammonium bromide and ammonium chloride.

7. A method for producing hydrogen peroxide according to claim 1 wherein the reaction medium is an aqueous solution containing a promoter and a hydrogen peroxide stabilizer.

8. A method for producing hydrogen peroxide according to claim 1 wherein oxygen and hydrogen are reacted directly in the presence of the platinum group metal catalyst of claim 1 in a reaction medium containing a promoter in the presence or absence of a non-reactive gas at a reaction temperature of 0° C. to 50° C. under a reaction pressure of between 3 kg/cm$^2$·G and 150 kg/cm$^2$·G.

9. A method for producing hydrogen peroxide according to claim 1 wherein the heteropoly acid is one which has been made insoluble by water by having part of the heteropoly acid protons exchanged with cations selected from the group consisting of the ions of the alkali metals, the alkali earth metals, the rare earth metals, thallium and ammonium.

10. A method for producing hydrogen peroxide according to claim 1 wherein the heteropoly acid is one which has been made insoluble by water by being adsorbed on activated carbon without having part of the heteropoly acid protons exchanged with cations.

* * * * *